Oct. 11, 1955   J. A. CAFFIAUX ET AL   2,720,578
SEMI-AUTOMATIC ASSEMBLY OF ELECTRICAL EQUIPMENT
Filed March 15, 1952   5 Sheets-Sheet 1

INVENTORS
JEAN A. CAFFIAUX
WILSON H. HANNAHS
BY
ATTORNEY

Oct. 11, 1955   J. A. CAFFIAUX ET AL   2,720,578
SEMI-AUTOMATIC ASSEMBLY OF ELECTRICAL EQUIPMENT
Filed March 15, 1952   5 Sheets-Sheet 2

INVENTORS
JEAN A. CAFFIAUX
WILSON H. HANNAHS
BY
ATTORNEY

Oct. 11, 1955    J. A. CAFFIAUX ET AL    2,720,578
SEMI-AUTOMATIC ASSEMBLY OF ELECTRICAL EQUIPMENT
Filed March 15, 1952    5 Sheets-Sheet 3

INVENTORS
JEAN A. CAFFIAUX
WILSON H. HANNAHS
BY
ATTORNEY

Oct. 11, 1955  J. A. CAFFIAUX ET AL  2,720,578
SEMI-AUTOMATIC ASSEMBLY OF ELECTRICAL EQUIPMENT
Filed March 15, 1952  5 Sheets-Sheet 5

INVENTORS
JEAN A. CAFFIAUX
WILSON H. HANNAHS
BY
ATTORNEY

United States Patent Office 2,720,578
Patented Oct. 11, 1955

2,720,578

SEMI-AUTOMATIC ASSEMBLY OF ELECTRICAL EQUIPMENT

Jean A. Caffiaux, Woodside, and Wilson H. Hannahs, Pleasantville, N. Y., assignors to Sylvania Electric Products Inc., a corporation of Massachusetts Application March 15, 1952, Serial No. 276,864

7 Claims. (Cl. 219—12)

This invention relates to semi-automatic assembly of electrical equipment. More specifically it relates to electrical components, wiring harness, supporting structure, and semi-automatic equipment for assembling and connecting these components and their related structures.

Recent developments in the electrical field in general, and more specifically in the field of electronics, have been directed to the techniques required for the production of electrical equipment characterized by simplicity and ease of manufacture and at the same time occupying the smallest space conveniently practicable. In this connection, new and improved miniaturized components have been provided and assembly techniques based on the use of "printed circuits" have been developed. Such progress as has been made in this field however, has been, in general, limited to the production of small equipments in which power handling capability was not a factor and where, accordingly, the components employed could be miniaturized quite readily. In such equipments the requirements of large surface areas for heat dissipation purposes are low due to the small currents ordinarily used.

This invention is concerned with the provision of structures and production equipment suitable for use in the production of electronic equipment in which relatively large quantities of power are handled. New and different methods of automatic assembly and new and different electromechanical structures are provided. The invention provides a structure utilizing the philosophy of the modern printed circuit in electrical equipment which provides satisfactory heat distribution and dissipation for such electrical equipment and in which efficient, compact assembly is produced.

An object of the invention, then, is to provide a method of assembling electronic equipments capable of dissipating a considerable amount of power by utilizing modern printed circuit techniques.

A further object of the invention is the provision of machinery adapted to the production of compact electrical equipment.

A still further object of the invention is the provision of a method of automatic assembly adapted to electrical equipments in which bulky components are utilized.

A still further object of the invention is the production of an electronic equipment unit suitable for production on modern rotating machinery.

A still further object of the invention resides in the provision of new connective prefabrication structures.

A still further object of the invention is the reduction of wiring labor costs by reducing the cost of making soldered connections and by providing new wiring harness and methods for soldering the harness to other components.

A still further object of the invention is the adaptation of printed circuit techniques to a flexible connecting harness.

Still other objects of the invention are realized by the invention in its preferred aspects as disclosed below in which a number of components are fabricated in substantially uniform dimensions for assembly end to end to form an elongated group from which the terminals project outwardly in a predetermined pattern to engage a close-fitting tubular insulating body. Conductors carried by the insulating body in predetermined patterns are connected to the outward extending terminals of the components by a simple mechanical interlock and thereby retained in position to be soldered. A machine is provided for facilitating assembly of the components by delivering them to a clamping device in the order and spaced relationship required, thereby facilitating insertion of the components into the insulated connecting sleeve.

Soldering of the assembled components and insulated sleeve is accomplished by indexing the assembly about its longitudinal axis and selectively causing a predetermined number of soldering heads to engage exposed functions of conductors and terminals. The assembly is automatically indexed to present a new set of unsoldered junctions to the soldering heads upon the completion of the previous soldering operation.

The completed assembly of components and insulating sleeve is adapted to be mounted within a tubular case, provision being made for a ridged bearing structure on the surface of the assembly sleeve adapted to engage the tubular container.

Figure 1:
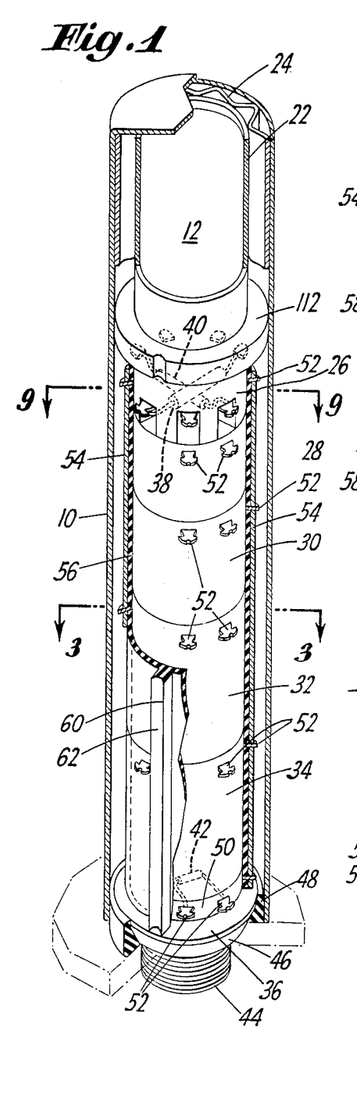
Fig. 1 is a view in partial cross section of an electronic amplifier embodying some of the principles of the invention.
Figure 14:
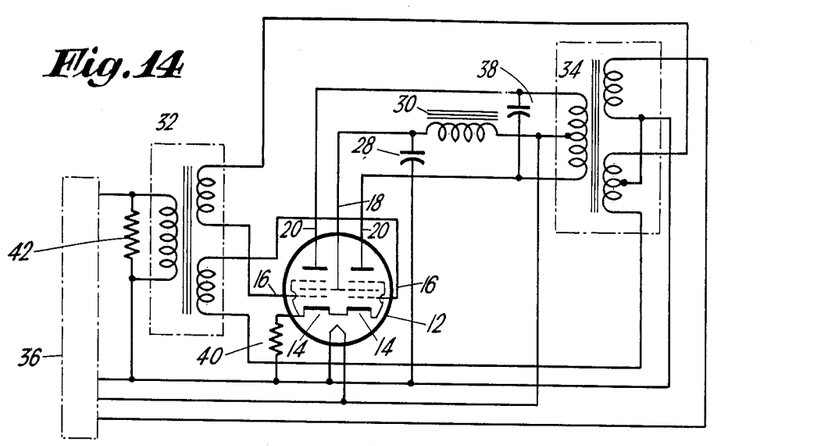
Fig. 14 is a schematic view of the electrical circuit utilized in the amplifier of Fig. 1.

Referring now to Figs. 1 and 14, in which a vacuum tube amplifier, which has been fabricated according to the teachings of the invention, is shown, it will be seen that the components of the amplifier have been fabricated in relatively uniform cylindrical form and inserted into a metal casing 10. The entire amplifier structure is disposed within casing 10 and employs vacuum tube 12 having two pentode sections with common cathodes 14, control electrodes 16, interconnected screens 18 and separate anodes 20. Vacuum tube 12 is fitted within closely fitting metal sleeve 22 which is in turn embraced by corrugated metal sleeve 24 which rests in intimate contact with the inside of casing 10 at its innermost end. Smooth sleeve 22 and corrugated sleeve 24 are provided to conduct the heat generated by operation of vacuum tube 12 away from tube 12 and the related electrical assembly.

Located immediately below vacuum tube 12 as shown in Fig. 1 is socket 26 which receives the connecting pins of vacuum tube 12. Mounted in an axial stack extending away from the bottom of vacuum tube socket 26 are electrolytic screen by-pass condenser 28, screen grid isolation choke 30, input transformer 32, output transformer 34, and output base plug 36. Mounted within suitable recesses in the base of the vacuum tube socket 26 are plate shunt capacitor 38 and cathode resistor 40. Input line matching resistor 42 is similarly located in output base plug 36. Output base plug 36 is shown in Fig. 14 by the rectangle in dot and dash outline at the left of the figure and designated 36. Base output plug 36, as shown in Fig. 1, is provided with threaded protruding sleeve 44 which is adapted to engage a suitable connector and to thereby serve as the principal support for maintaining the assembly in place on an associated piece of equipment. Immediately above threaded portion 44 is tapered disc section 46 which is adapted to receive around its periphery flexible gasket 48. Gasket 48 may be compressed within the space provided between disc 46 and metal shell 10 to provide secure anchorage for metal shell 10. Located immediately above tapered disc 46 is narrow cylindrical raised portion 50 out of which connector lugs 52 project. Connections between the various terminal lugs 52 projecting from components assembled within metal shell 10 is provided by suitably located metal strips 54 which may run the length of the assembly and which are supported by, and insulated from, the metal walls of the various components by insulating sleeve 56. The exact structure and method of connecting the components utilizing strips 54 and insulating wrap 56 will be explained in greater detail below.

It should be understood that the amplifier assembly illustrated herein has been chosen for the sake of illustration. The amplifier is of the sort which would be useful in interphone amplifier applications for use in interior communications work at audio frequencies. The amplifier circuit is straight forward, utilizing a push-pull circuit with transformer coupling in and out and inverse feed-back from the output transformer winding to the grid windings of the input transformer. Inasmuch as the design is conventional and the use of the amplifier is illustrative, further consideration of the amplifier circuitry will be omitted.

Figure 2:
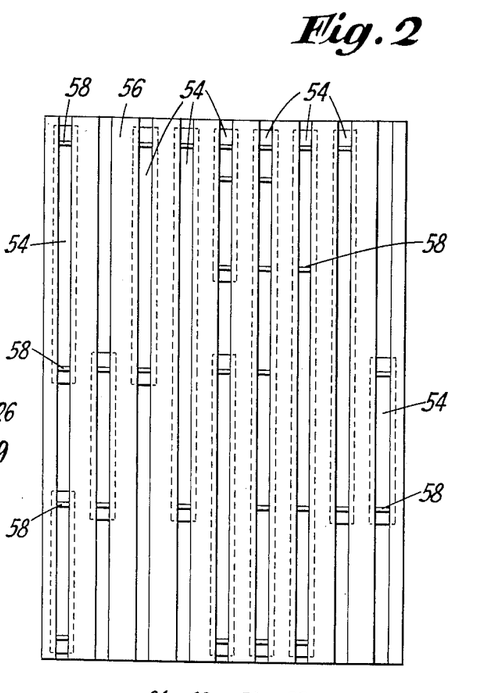
Fig. 2 is a developed view of the connective harness or wrap utilized in the amplifier illustrated in Fig. 1.
Figure 3:
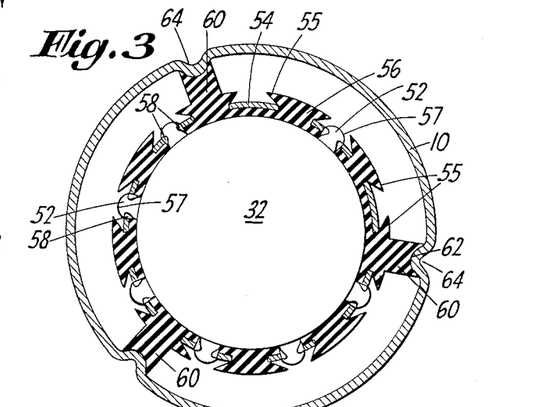
Fig. 3 is a view in cross section of the amplifier structure of Fig. 1.
Figure 6:
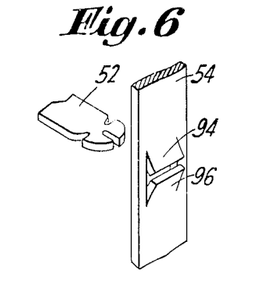
Fig. 6 is a detail view of a construction useful in making connection between wrap and components in constructing the amplifier shown in Fig. 1.

A better understanding of the connective harness and support for the stacked assembly of components shown in Fig. 1 can be derived by considering Figs. 1, 2 and 3 together. A preferred embodiment of the wrap-around structure is shown in Fig. 2. It is composed of preformed nitrile rubber sheet 56 which carries the connector strips 54 in grooves having retainer projections 55. Pressure exerted by the sloping inner faces of retainer projections 55 on connector strips 54 serves to retain strips 54 in place within rubber wrap 56 when it is wrapped around the assembled components. Reference to Fig. 3, in which the connector wrap is shown in place around transformer 32, shows that even when wrap 56 is in place around the cylindrical stack of components utilized in the amplifier assembly, the overhanging sloping portions 55 of the slots which carry connecting straps 54 serve to retain straps 54 in place. In Fig. 2 it will be seen that straps 54 may extend the entire length of the wrap 56 so as to provide connecting means between those terminals 52 associated with socket 26 at the uppermost end of the component stack and those terminals 52 associated with base connecting plug 36 at the lowermost end of the assembly. Other connecting straps 52 may be made of shorter length extending only between various intermediate connecting lugs 52 on intermediate components in the assembly. The various connecting straps 54 are provided with apertures cut through the thickness of the strap, as shown in Fig. 6, for example, which are adapted and so positioned that they will be penetrated and engaged by the individual connecting lugs 52. The straps 54 and their associated apertures 58 are strategically placed in wrap 56 according to a predetermined plan in accordance with the circuitry necessary to interconnect the components so that upon presentation of wrap 56 to a prearranged stack of components, the required connections between components may be made by light pressure on the wrap-around whereby lugs 52 are caused to pass through slots 58 in connecting straps 54. By this means the entire wiring harness is pressed into engagement simply and quickly with all terminals of all components of the amplifier between which connections are to be made. Connecting lugs 52 are provided with rounded ends 57 and with slots 58 on either side of the ends 57 so as to penetrate and to engage connecting straps 54. The dimensions of lugs 52 and apertures 58 are such that a sufficient interlock is obtained between lugs 52 and straps 54 to retain wrap 56 in place around the stacked components thereby providing support for the assembly until the soldering operation is completed.

Figs. 1 and 3 also show ribs 60 which may be made integral with the wrap 56 and which run the length of the wrap-around to provide lateral support for the assembly within casing 10. Grooved surfaces 62 are provided on ribs 60 and run longitudinally the length thereof to provide means for engaging corresponding longitudinal shell ribs 64 on the inner surface of amplifier casing 10. The cooperation of shell ribs 64 and wrap ribs 60 serves to stabilize the amplifier assembly within case 10 and provide lateral support and shock mounting for the component parts. The wrap 56 by itself provides adequate rigidity and support for the components for maintenance of the amplifier when removed from shell 10.

Figure 4:
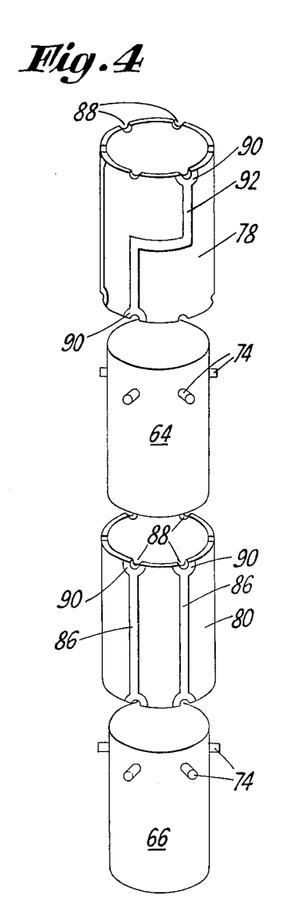
Fig. 4 is an exploded view of an alternative embodiment of the amplifier assembly construction employed in Fig. 1.
Figure 5:
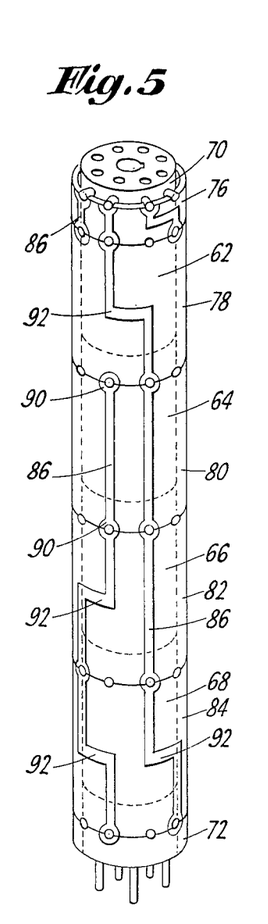
Fig. 5 is a perspective view in part of an amplifier assembled according to the principle disclosed in Fig. 4.

An alternative embodiment of the tubular harness feature of the invention is shown in Figs. 4 and 5, Fig. 4 presenting an exploded view of a portion of the amplifier assembly of Fig. 5. In the drawing of Fig. 5 the stacked components are shown as cylinders 62, 64, 66, and 68 which are outlined by the dashed lines. At the top of the stack is vacuum tube socket 70 and at the bottom, connector plug 72. Each of the components including the socket and plug are provided with radially extending pins 74. Surrounding the stack, and assembled step by step with each of the components, are hollow cylindrical insulating sections 76, 78, 80, 82, and 84. On the exterior surface of the various plastic cylindrical sections are straight connector strips 86 and zig-zagged connector strips 92 which may be applied to the surfaces of the various cylinders by conventional printed circuit techniques. At the top and bottom of each of the cylindrical sections are semi-circular cut outs 88 which are shaped to conform with, and located in position to receive the various radially projecting pins 74. Connective strips 86 are provided with expanded portions 90 at either end so as to surround pin-receiving cut-outs 88 and permit ready solder connection thereto. The connective strips may be so fabricated as to pass directly along the cylindrical length of the plastic sections, or, as in the case of the connective strips designated 92, the strips may traverse the shell circumferentially thereby providing means for connecting a pin located on one radius at one end of a cylinder with a pin located along another radius at the other end of the cylinder. Each of the various cylindrical sections is provided with connective strip coatings designed to produce connections related to the proper interconnection of each of the components in the stack according to the circuit employed. It will be seen, as in Fig. 5, that, when the assembly is completed, electrically conductive paths will extend, where required, from connective pins at the very top of the assembly to connective pins located at the very bottom of the assembly.

The embodiment employing the rigid tubular harness shown in Figs. 4 and 5 and described above provides a readily assembled structure utilizing printed circuits and having inherent mechanical strength which is well adapted for automatic assembly. In automatic assembly, each of the components, beginning with the connector plug at the bottom of the amplifier, is deposited automatically in a stack by delivery, in order, from hoppers arranged along a conveyor. Delivery of connector plug 72 to the conveyor is followed by delivery of cylindrical section 84, then component 68, and successive components in order. The stacked assembly is then clamped endwise to prevent disassembly and delivered to a soldering apparatus, such as the one described below, for completion of the electrical connections.

The fabrication of the plastic cylinders employed in the cylindrical amplifier structure of Figs. 4 and 5 is relatively straightforward. The cylindrical sections may be made of any convenient insulating material which adapts itself to the form required. The conductive strips located on the outside of the plastic cylindrical sections may be applied by conventional printed circuit techniques, such as printing, silk-screening, plating, etc.

Figure 7:
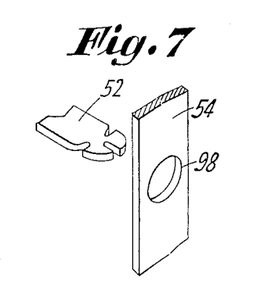
Fig. 7 is a detail view of an alternative construction suitable for use in making connection between wrap and components in constructing the amplifier of Fig. 1.
Figure 8:
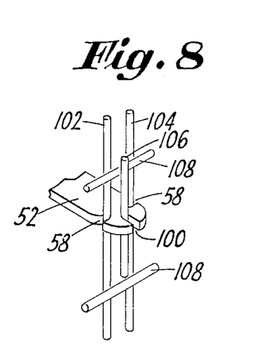
Fig. 8 is a detail view of a second alternative construction useful in making connection between connective strips in the wrap and the components of the amplifier of Fig. 1.

The wrap type of tubular harness structure of Fig. 2 has been shown therein in its preferred embodiment, namely nitrile rubber having outward facing retaining slots for receiving connector straps. Figs. 6, 7, and 8 illustrate alternative constructions for use in making a quick attachable connection between a connector carried by the wrap, and a connector lug, such as was illustrated in Figs. 1 and 3. In the structure of Fig. 6, connection is made between a conductive strap and a terminal lug in the manner of Figs. 1, 2, and 3. The detail of the plastic wrap has been omitted from the drawing to show clearly the nature of the connector strap used. In this case, strap 54, made of an electrically conductive material such as copper, is prepared prior to insertion into the wrap by stamping with an H-cut having a width across the H substantially equal to the width of connector lug 52. Metallic flaps 94 and 96 are produced as a result of the H-cut and pass on to the parallel surfaces of lug 52 as lug 52 is pressed through the aperture of the H cut. The structure illustrated by Fig. 7 is a simplified version of the structure of Fig. 6 and comprises an aperture 98 having a width substantially equal to that of lug 52, being received. A third type of connector strap aperture, not illustrated, comprises simple cross-slots in the conductor strap, which, when penetrated by the terminal lug, permits portions of the strap material to bend outwards forming an aperture in the strap.

The structure shown in Fig. 8 illustrates a method of fabricating connector straps for use in a wrap out of a wire mesh or screen. In this case, the lug 52 is provided with lateral slots 58 and end slot 100 which, upon penetration of the lug into the mesh, engage vertical wires 102, 104 and 106 in the mesh, thereby uniting the lug and the strap temporarily, until the soldering operation is completed. Lateral wires 108 serve as what could be called the woof of the wire mesh. Structures employing only vertical wires, such as wires 102 or 104 of the mesh or simply one single wire such as wire 106, are alternative structures embodying the principle of the invention.

The flexible backing which forms the principal part of the wrap type of tubular harness may be made of other materials than the nitrile rubber of the preferred embodiment and may be attached to the conductor straps in other ways. For example, in an embodiment for use in situations where it is desirable to use a simple vertical wire as the wrap conductor element, the wrap backing material comprises a glass fabric using the wires as occasional elements in the warp of the cloth, interposed between glass fibers of the warp. Where more insulation is required, wire carrying cloth is sandwiched between second and third layers of glass cloth or other insulating material and then impregnated with plastic binder. Cut outs may be provided in the outer insulating layers before the lamination process takes place to facilitate access of the connector lug to the conductor wires within.

In another alternative embodiment, the conductor wires, straps, or mesh are cemented between resin or plastic impregnated papers, or vulcanized between rubber sheets. Such an assembly is readily fabricated by spooling off the conductor material simultaneously with the insulating sheets and feeding the sandwich so formed directly into subsequent heat sealing and punching operations. In a further embodiment of the invention, a sheet of metal foil is laminated with an elastomer, and areas of foil etched away to produce the necessary conductive pattern. Further insulation is accomplished by covering the conductive foil pattern with another layer of elastomer.

One embodiment of the first type of structure, for example, utilizes brass strips .005 inch thick which are sandwiched between two sheets of a vinyl insulating compound, the assembly being sealed together under heat and pressure. A material such as that known by the trade name "Geon" has the desired qualities of insulation, thermal plasticity, and ease of fabricating for this use.

Any one of the structures mentioned above may, of course, be formed with the rigid bearing structure of Fig. 3 or other outward extending surface so as to press against a container wall, thereby lending rigidity to the entire structure.

Use of specially shaped terminal lugs having an irregular edge, such as the lugs illustrated in Figs. 3, 6, 7, and 8, is necessary in order to satisfy requirements imposed by the need to have an assembly capable of fabrication semiautomatically. The lug described is one which is attachable to the connective wiring, straps, etc., by simple action and which is adaptable for use on all types of components, including sockets and plugs, and which will serve the purpose of providing a simple mechanical interlock with the superimposed harness structure. The terminal structure shown is capable of providing a quick, ready lock with wraps using single or multiple strands of wire, metal straps with round rectangular or irregularly shaped apertures, or wire screen. A simple snapping action serves to produce the desired mechanical interlock.

Figure 9:
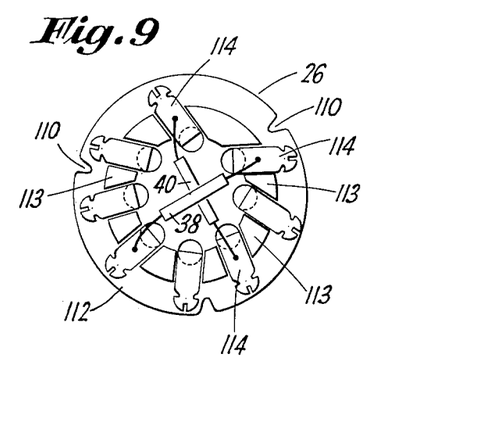
Fig. 9 is a plan view of the bottom of an electrical socket suitable for use in the amplifier of Fig. 1.

In Fig. 9 is shown a bottom view of the vacuum tube socket 26 of Fig. 1. The socket is generally cylindrical in configuration and has its outermost cylindrical surface provided with longitudinal grooves 110 which are adapted to receive the lengthwise ridges 64 of container 10, thereby stabilizing the socket within the assembly. Referring for a moment to Fig. 1, it will be seen that the wide flanged portion 112 of the tube socket 26 rests against the wall of container 10. In some instances, it may be desirable to surround this portion of the tube socket with the wrap structure. The lower portion of tube socket 26 is reduced in diameter to accommodate the wrap which extends over it to engage terminals 52 on the socket. In the drawing of Fig. 1, connector lugs 52 project outwardly from individual slots cut in the insulated socket material either radially or at a skew angle to the axis of the socket. By cutting the terminal slots deep, and by hollowing out the central portion of the socket, space has been made to accommodate small electrical components 38 and 40 which are connected directly between pairs of lugs 114. The raised portions of the base, designated 113, serve to space the socket and components within from the next adjacent component. The socket connecting lugs 114 have extensions projecting upwards at right angles into the clip-receiving apertures of the socket as a matter of mechanical convenience. Full detail is not shown of this socket clip structure as it is of a type already known in the art. Free (unused,) terminals of the socket may be used as tie points according to conventional radio construction practices.

A structure similar to that used in Fig. 9 for the vacuum tube socket 26 is utilized on base plug 50 to provide additional space for accommodating small component parts of the amplifier circuitry. Where a large number of small components is to be assembled in the amplifier, hollow cylindrical structures, (not shown in drawings) made of suitable insulation material are utilized. The components are placed within the hollow cylinder and connected to lugs projecting through the wall of the cylinder to engage the tubular harness.

Figure 10:
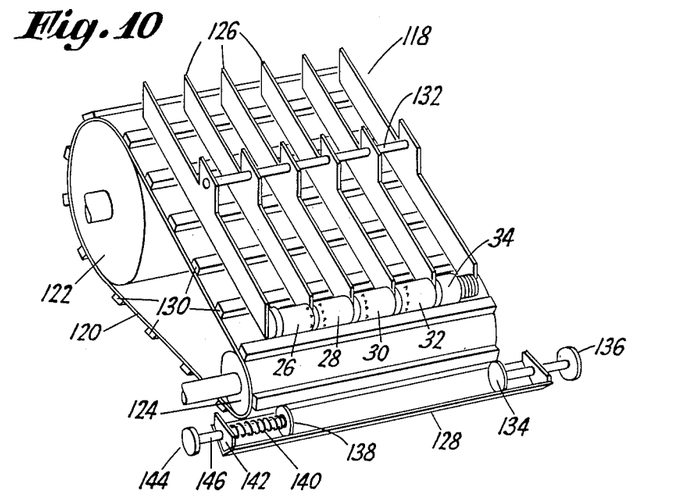
Fig. 10 is a perspective view of an assembly conveyor, delivery receptacle, and clamp utilized in the assembly of the amplifier of Fig. 1.

For assembly of the amplifier structure shown in Figs. 1, 2, and 3, supply hopper 118, shown in Fig. 10 is employed. The amplifier components are set on the upper end of conveyor belt 120 which is supported by rollers 122 and 124 and are moved by belt 120 between guides 126. Conveyor belt 120 is given a slope towards receiving trough 128 because of the greater diameter of rear roller 122. Cross bar members 130, attached to the belt, serve to retain the components in line and to keep them from rolling down into the trough 128. The speed of belt 120 is made variable to control the rate of delivery of aligned components to trough 128 by means of conventional mechanisms attached to a motor (not shown) which drives roller 122 or 124. Component spacers 126 are supported above the surfaces of cross strips 130 by suitable framework (not shown) supporting spacer rod 132. Located adjacent to the lower end of feeder belt 120 and located parallel to roller 124, in a position to receive the oriented components as they leave the belt is receiving trough 128. This trough may have a triangular cross section, as illustrated, or may be gently curved to provide a recess into which components 26, 28, 30, 32 and 34 may drop. The wrap type harness of Figure 2 is applied by hand to the oriented components as they rest in trough 128 and fastened thereto by rotating the assembly in the trough, light pressure being used to engage the terminal lugs with conductor strips of the wrap. An improper fit of the component parts to the wrap is impossible since the terminal lugs of each part are keyed to the wrap by their own characteristic terminal spacing, and by the provision of corresponding aperture patterns in the wrap. As an aid to the operator in lining up the components, the components may be notched, keyed to engage belt bars 130, or marked with dots indicating the proper orientation for each component as it is received at the top of conveyor belt 120. The parts may be fed to conveyor belt 120 at its upper end by hand or may be received from suitable hoppers or other mechanical feed arrangements known in the art. As an aid to retaining the component parts in a close spaced relationship during this assembly step, the right hand end of trough 128 has been provided with a ball bearing mounted rubber tipped tail stock 134 which is provided with hand wheel 136. At the left end of trough 128 is ball bearing mounted rubber faced head stock 138 provided with compression spring 140 mounted between trough end plate 142 and the back surface of head stock 138 so as to exert a pressure in the direction of the tail stock upon components placed therebetween. To permit undisturbed entry of the components into the trough, hand wheel 144 is provided on head stock 138 so that the operator may apply an outward directed force to head stock shaft 146 thereby sliding the head stock assembly away from the receiving portion of trough 128.

Operation of the assembly hopper of Figure 10 comprises loading prefabricated cylindrical components including socket 26, capacitor 28, transformers 30 and 32, and connector base plug 34 into the upper end of the conveyor belt. Conveyor belt 120 then moves until the component parts are dropped into assembly trough 128. Head stock face plate 138 is then allowed to come to bear against socket component 26 and to press the components together end to end against tail stock 134. The operator then applies the wrap harness, using tail stock hand wheel 136 to rotate the stack of components as necessary. Upon completion of the connection of the wrap with the terminal lugs of the components, the head stock is backed away from the amplifier assembly, and the assembly is removed for soldering to the machine described below. Ordinarily it will be found that the interlock structure provided between the wrap-around and the various components which it now surrounds will have sufficient strength and rigidity to permit transfer of the assembly from trough 128 to the soldering machine without undue care as to flexure or accidental disassembly of the unit.

Figure 11:
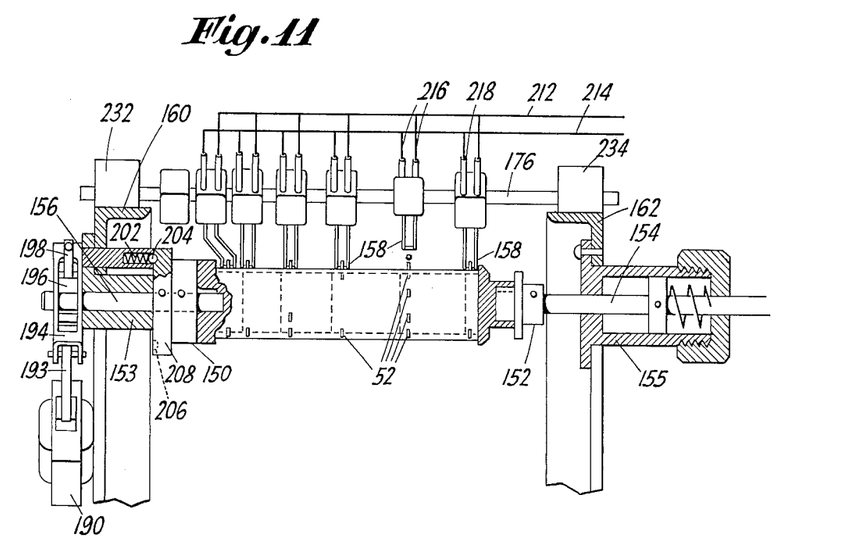
Fig. 11 is a view in partial cross section of a machine suitable for use in soldering the amplifier assembly of Fig. 1, showing the soldering heads and the amplifier assembly in the work position.
Figure 12:
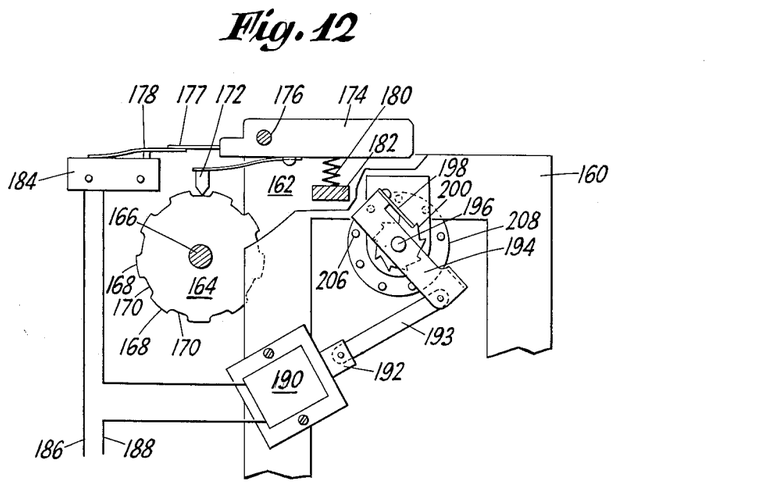
Fig. 12 is a cross section of the apparatus of Fig. 11 illustrating a timing cam and work advance mechanism.
Figure 13:
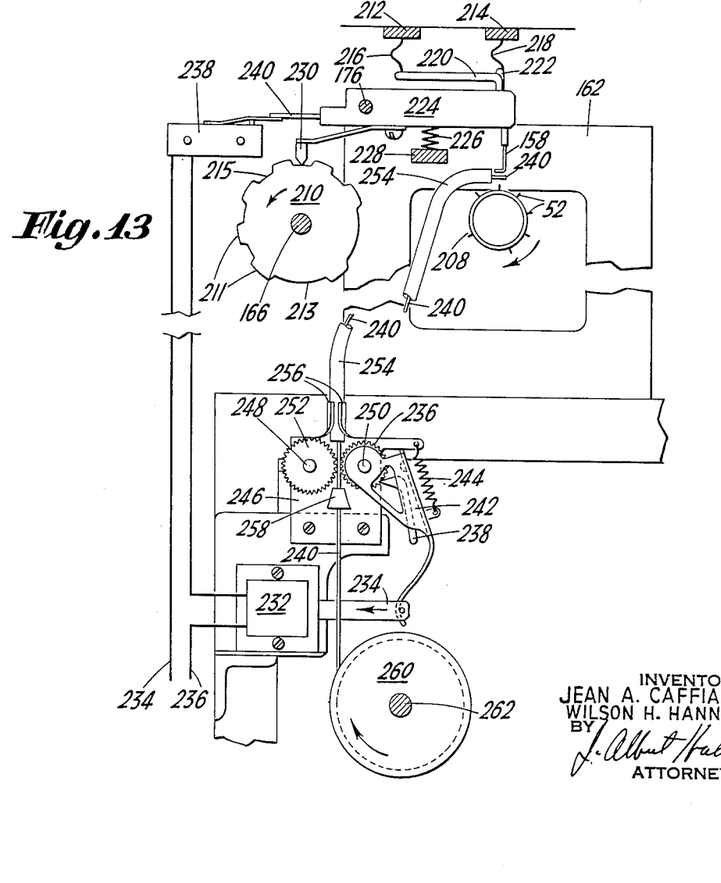
Fig. 13 is a side view in partial cross section of the soldering apparatus of Fig. 11, showing a soldering head and an associated solder feed mechanism.

Figures 11, 12 and 13 show views of a soldering machine which is adapted to automatically solder the amplifier assemblies previously described. The machine provides soldering heads for even and rapid heating of the terminal and strap conductor in spite of the automatic nature of the operation of the machine. In general, the machine of Figure 11 is adapted to handle the cylindrical stack of components of Figure 1 by turning it about its cylindrical axis so that a given row of areas to be soldered along the length of the work is exposed to individual soldering heads located along the length of the work in the plane of the terminals of each component.

The cylindrical stack of components within the tubular harness is held in the soldering machine by rotatable chucks 150 and 152 which are adapted to engage socket 26 and into output connector plug 36 at either end of the stack of assembled components. Spring loaded shaft 154, attached to chuck 152, permits lateral motion of chuck 152, thereby facilitating insertion of the amplifier assembly into the chucks. Rotation of chucks 150 and 152 is made possible by suitably journalling their associated spindles 156 and 154 in blocks 153 and 155. By this means and by a mechanism to be described below, the amplifier assembly may be indexed in suitable steps around its longitudinal axis to present a given row of connector lugs to soldering heads 158. The entire soldering machine assembly is supported by frames 160 and 162 of a conventional structural nature.

In this embodiment of the invention, the amplifier assembly has been constructed with the component terminal lugs spaced at 40 degree intervals around the circumference of the individual components. This has been found to be a useful spacing in that it provides nine connector lug positions for each component, which is an adequate number for the amplifier circuitry, and at the same time provides adequate clearance between the individual connector lugs for the presentation of soldering tool 158. It should be apparent to the reader that other conductor lug dispositions can be employed where so desired.

In the side view, Figure 12, of the soldering machine of Figure 11, the detail has been limited to the indexing and cam control mechanisms employed to index the amplifier assembly to the various soldering positions. Programming cam 164 is fastened to cam drive shaft 166, which is attached in turn to a suitable motor for providing constant angular rotation of the programming cam 164. The motor for rotating the cam drive shaft 166 has been omitted from the drawings for the sake of simplicity. The motor used should be of the variable speed type so as to provide a variable timing cycle for the operation of the entire machine. Rotation of cam 164 causes the face of cam 164 to present alternatively high and low areas 168 and 170, respectively, to cam follower 172. Alternative raising and lowering of cam follower 172 by the high and low areas, 168 and 170 of the face of cam 164 causes intermittent oscillatory rotation of cam lever 174 about cam lever support shaft 176 and transmission of motion from cam lever 174 through extension arm 177 to microswitch operating arm 178. Cam lever 174 is spring loaded by cam lever loading spring 180 working against cam lever loading spring rest 182 on frame 160 of the soldering machine. Cam lever loading spring 183 serves to keep cam follower 172 in constant engagement with the face of cam 164, thereby assuring positive operation of the cam indexing mechanism. Motion transmitted by extension arm 177 to microswitch 184 causes microswitch 184 to be alternately opened and closed. The opening and closing of microswitch 184 controls the application of voltage supplied through leads 186 and 188 to work indexing solenoid 190 which is anchored to the supporting frame 160 of the soldering machine. Application of voltage to solenoid 190 causes solenoid armature 192 to be drawn into solenoid 190, thereby causing motion of ratchet operating arm 194 about its pivot point on ratchet axle 196. Ratchet pawl 198 engages teeth on ratchet wheel 200 which are spaced at the 40 degree interval chosen for the work index step. Ratchet axle 196 is an integral extension of work chuck axle 156 and motion of the ratchet wheel 200, which is firmly attached to the extension 196, is thus transmitted therefrom to the work supported by chuck 150. Precision of indexing and accurate positioning of the work is secured by means of a locking detent mechanism comprising spring 202 and ball 204 which operate against suitably spaced and shaped recesses 206 in the rear surface of face plate 208 behind chuck 150.

In addition to programming cam 164, additional timing cams are used at each of the soldering work stations to control the selection of soldering heads 158 so that heads will be presented only to those areas on the work which are to be soldered on a given work cycle. One of the cams 210 is shown in Figure 13 which shows a typical soldering work station on the soldering machine of Figure 11. The work being soldered is shown in cross section at 208 and has projecting radial lugs 52 as indicated previously. The cam timing shaft 166 runs parallel and to the rear of the work and ordinarily will be directly connected to the indexing timing cam and the indexing timing shaft drive motor. The various work station cams 210, such as the one illustrated here, have profiles adapted to cause the soldering heads to be lowered against the work 208 only when a connecting lug 52 is presented directly beneath soldering head 158. Raised portions 211 on the cam profile cause presentation of head 158 to the work, and depressed portions 213 and 215 permit withdrawal of head 158 from the work. Soldering head 158 in this embodiment of the invention is a loop of brass wire heated by current transmitted from a welding transformer, which is not shown in the drawing, to soldering loop 158 by means of bus bars 212 and 214, flexible lead wires 216 and 218, and soldering head connector leads 220 and 222. Soldering head connecting leads 220 and 222 are supported by soldering head operating block 224 which is biased into normally upwards position by soldering head operating block spring 226 which operates between the soldering block operating head 224 and anchor lug 228 extending from soldering machine frame 162. Soldering head operating block 224 is moved by motion transmitted through cam follower 230 from the profile of soldering work station cam 210. Soldering head block 224 pivots about support rod 176 which runs transversely of the machine as shown in Figure 11 and which is supported by blocks 232 and 234 mounted on soldering machine supporting frame angle brackets 160 and 162.

The mechanism for feeding solder to the soldering head and the work is shown in the lower portion of Figure 13. Operating voltage to control solder feed solenoid 232 is obtained from connecting leads 234 and 236 and controlled by microswitch 238. Microswitch 238 is operated in this embodiment of the invention by microswitch operating lever 240 extending outward from, and attached to, solder head operating arm 224. In this manner, the voltage which controls operation of solder feed solenoid 232 is synchronized to the operation of soldering head 158, the timing of both being controlled by soldering head timing cam 210. Where more flexible control of the timing relation between the operation of soldering head 158 and the solder advancing mechanism is desired, a separate cam may be used to operate solder advance control microswitch 238.

The solder feed mechanism receives its actuation from solenoid 232 which operates to provide linear motion to armature 234. The motion of armature 234 is transmitted, in turn, to ratchet wheel 236, the serrated face of which engages pawl 238 and at the same time engages solder 240 being fed to the work. Connecting arm 242 imparts the motion derived from armature 234 to pawl 238 and connects with return spring 244 which is anchored to back plate 246. Back plate 246 supports spindles 248 and 250 for solder idler wheel 252 and solder drive and ratchet wheel 236. Back plate 246 is anchored to the frame of the soldering machine.

Solder feed pipe 254 is anchored to back plate 246 by formed supports 256. Solder feed pipe 254 terminates near soldering head 158 and is positioned so that motion of soldering head 158 towards the work will carry solder towards the work as the soldering head passes the solder feed delivery tube. The solder, which will ordinarily be of a wire type, is fed to the solder feed mechanism through solder guide 258 from spool 260 which rolls on axle 262 of the soldering machine frame.

The sequence of operations by the automatic soldering machine described above is as follows. Solder 140 is advanced to provide a fresh supply of solder to resistance heated soldering head 158 before descending soldering head 158 passes the point of discharge of solder from solder feed pipe 254. Soldering head 158 is then presented to the terminal lug 52 on the work, carrying with it molten solder carried away from the solder feed. Soldering tool 158 rests against the work long enough to heat all parts being soldered and to cause solder to flow thereon and is then allowed to return to its resting position away from the work. Work 208 is then indexed 40° to present the next set of terminals for soldering. All of these operations are properly timed and sequenced by work indexing cam 164 and soldering work station cams 210. Upon completion of soldering operations at all nine positions of unit work assembly 208, the rotation of timing cam shaft 166 is interrupted to stop the operation of the machine and to permit the removal of the completed unit assembly and insertion of a new work unit in place. After the addition of a vacuum tube, the completed unit assembly will be ready for insertion into metal shell 10 and, after test, it is ready for use.

While the foregoing description has been of specific embodiments of the invention, it has been made so by way of illustration and it is desired that the below appended claims should be interpreted in accordance with the spirit of the invention.

What we claim is:

1. In a soldering machine, the combination of means for holding work to be soldered and for indexing said work to preselected positions, means for locating a multiplicity of soldering devices adjacent to said work-holding means, means for selectively presenting a number of said soldering devices to said work to effect predetermined patterns of soldered joints on said work, and timing means for initiating operation of said work indexing means and said soldering device presenting means so as to individually apply predetermined patterns to said work at said preselected positions.

2. In a soldering machine, the combination of means for holding work to be soldered and for indexing said work to preselected positions by rotary motion, means for locating a multiplicity of soldering devices adjacent to said work-holding means, means for selectively presenting a number of said soldering devices to said work in each of said positions to effect predetermined patterns of soldered joints on said work, and timing means for causing said work holder to be indexed to expose a new work area to said soldering devices after a pattern has been completed on a given area and for initiating the production of another pattern on said new area.

3. In a soldering machine, the combination of means for holding work to be soldered and for indexing said work to preselected positions, means for locating a multiplicity of soldering devices adjacent to said workholding means, means for selectively presenting a number of soldering devices to said work to effect predetermined patterns of soldered joints on said work, said presenting means including means for causing said selected soldering devices to approach said work to initiate a solder operation and to be withdrawn from the work upon completion of said soldering operation, and timing means for initiating in sequence an indexed step of said work-holder, selection of said soldering devices to produce a predetermined soldering pattern, and performance of said soldering operation.

4. In a soldering machine, the combination of means for holding a cylindrical body on which soldered joints are to be made and for indexing said body about its axis to preselected positions, a group of soldering tools located adjacent to said cylindrical body and adapted for individual movement into and out of engagement with the surface of said body, means for selecting a number of said soldering tools to make soldered joints on said cylinder according to predetermined patterns, means for causing said tools to contact said cylinder, and control means for regulating the indexing of said cylindrical body and the selection of said soldering tools so as to cause predetermined portions of said cylinder to receive predetermined patterns of soldered joints, said control means including means for successively initiating indexing steps, soldering tool selection steps, and cylinder contacting steps.

5. The method of soldering including the steps of holding work in position for soldering, selectively presenting a number of soldering devices to said work to effect a predetermined pattern of soldered joints on said work, indexing said work to expose a successive portion of said work to said soldering devices, and selectively presenting a number of said soldering devices to said work to effect a different predetermined pattern of soldered joints on said work.

6. A soldering machine for making connections in electrical assemblies, said electrical assembly being of a general cylindrical configuration, having means for mounting said cylinder for rotation about its axis, means for periodically indexing said cylinder about its axis to expose new areas of work, soldering head supporting means mounted parallel and adjacent to said work supporting means, a number of soldering heads spaced along the axis of said work and pivotably mounted adjacent thereto on said supporting means, and individual cam operating means associated with each of said soldering heads and operatively connected therewith for pressing said soldering heads against said work, said cams being indexable along with said work and having a profile corresponding to a predetermined pattern of soldered joints to be produced by said associated soldering head.

7. A machine for individually soldering a plurality of joints which are radially displaced with respect to the surface of the cylindrically shaped work piece, said joints falling along a plurality of parallel paths extending along the direction of the axis of the work piece, said paths being equidistantly spaced from each other, said machine comprising a soldering station; means to intermittently rotate said work piece about its axis to successively position each path in turn at said station for a predetermined dwell period; and means positioned at said station and synchronized with said work piece rotation to solder the joints falling along each positioned path, said positioned means including a plurality of soldering heads, means to move said heads into registration with the joints to be soldered during each dwell period, and means to move said heads out of registration with the soldered joints during each dwell period.

References Cited in the file of this patent

UNITED STATES PATENTS

| | | |
|---|---|---|
| 1,508,076 | Taylor | Sept. 9, 1924 |
| 1,702,451 | Phillippi | Feb. 19, 1929 |
| 1,703,588 | Meadowcroft | Feb. 26, 1929 |
| 2,057,794 | Sorenson et al. | Oct. 20, 1936 |
| 2,209,213 | Vernon | July 23, 1940 |
| 2,292,117 | Grimshaw | Aug. 4, 1942 |
| 2,321,071 | Ehrhardt et al. | June 8, 1943 |
| 2,351,116 | Frankwich et al. | June 13, 1944 |
| 2,476,641 | Van Winkle | July 19, 1949 |
| 2,492,236 | Mydlil | Dec. 27, 1949 |
| 2,494,474 | Fermanian et al. | Jan. 10, 1950 |
| 2,508,018 | Ellwood | May 6, 1950 |
| 2,538,070 | Wright et al. | Jan. 16, 1951 |
| 2,554,876 | Olson | May 29, 1951 |
| 2,591,065 | Habel | Apr. 1, 1952 |
| 2,607,821 | Van Arsdale | Aug. 19, 1952 |
| 2,611,040 | Brunetti | Sept. 16, 1952 |